(12) United States Patent
Weston et al.

(10) Patent No.: US 11,608,027 B2
(45) Date of Patent: Mar. 21, 2023

(54) METHOD AND APPARATUS KEY-CENTRIC PORTABLE VEHICLE STATE SETTINGS

(71) Applicant: FORD GLOBAL TECHNOLOGIES, LLC, Dearborn, MI (US)

(72) Inventors: Keith Weston, Canton, MI (US); Andrew Thomas Cunningham, Royal Oak, MI (US); Joshua Sharpe, Birmingham, MI (US); Charles Richard Drake, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 791 days.

(21) Appl. No.: 16/207,651

(22) Filed: Dec. 3, 2018

(65) Prior Publication Data

US 2020/0172052 A1    Jun. 4, 2020

(51) Int. Cl.
*B60R 25/20* (2013.01)
*B60R 25/22* (2013.01)
*G06F 13/40* (2006.01)

(52) U.S. Cl.
CPC .......... *B60R 25/2081* (2013.01); *B60R 25/22* (2013.01); *G06F 13/4063* (2013.01); *G06F 2213/40* (2013.01)

(58) Field of Classification Search
CPC . B60R 25/2081; B60R 25/22; B60R 16/0232; G06F 13/4063; G06F 2213/40; H04L 12/40; H04L 2012/40215; H04L 2012/40273

USPC .......................................................... 701/36
See application file for complete search history.

(56) References Cited

U.S. PATENT DOCUMENTS

| | | | |
|---|---|---|---|
| 9,133,784 B2 | 9/2015 | Seaman et al. | |
| 9,694,824 B2 | 7/2017 | Desjarlais et al. | |
| 2005/0237150 A1 | 10/2005 | Sun et al. | |
| 2008/0150685 A1* | 6/2008 | Desai .................. | B60R 25/2081 340/5.61 |
| 2014/0375462 A1* | 12/2014 | Biondo .................. | G08B 21/02 340/576 |
| 2017/0129427 A1* | 5/2017 | Park ....................... | B60K 35/00 |
| 2017/0369071 A1 | 12/2017 | Gould et al. | |
| 2020/0164835 A1* | 5/2020 | Chung ............... | G07C 9/00563 |

FOREIGN PATENT DOCUMENTS

JP        2014185482 A    * 10/2014

* cited by examiner

*Primary Examiner* — Maceeh Anwari

(74) *Attorney, Agent, or Firm* — Joseph Zane; Brooks Kushman P.C.

(57) ABSTRACT

A system includes a processor configured to detect a vehicle key and display a key identification on a vehicle display. The processor is also configured to receive a request to export vehicle system and state settings to a key memory. The processor is further configured to access a plurality of predefined settings, designated as key-storable settings, from a vehicle CAN bus, responsive to the request, and transmit the predefined settings to the key, including instructions to store the settings to the key memory.

17 Claims, 6 Drawing Sheets

METHOD AND APPARATUS KEY-CENTRIC PORTABLE VEHICLE STATE SETTINGS

TECHNICAL FIELD

The illustrative embodiments generally relate to methods and apparatuses for key-centric vehicle state settings.

BACKGROUND

Vehicles are increasingly complex with every new model release. Increased onboard computing, user customizable features, advanced entertainment, powertrain, and other system controls continue to improve and allow for advanced user interaction. While vehicle presets used to be confined to radio and seat settings, now sophisticated users can enact a great degree of direct control over a variety of vehicle systems.

As vehicle systems advance, the more sophisticated controls may require user acquiescence to disclaimers and the like before a setting can change, and many systems tend to revert to base control settings upon key-off and key-on. Further, when users change vehicles, they may have to determine which controls exist in a new vehicle, and then determine how to use the new vehicle interface to set those controls. The same is true when a user buys or leases a new vehicle, even if it is just a new model of an older, previously owned vehicle.

SUMMARY

In a first illustrative embodiment, a system includes a processor configured to detect a vehicle key and display a key identification on a vehicle display. The processor is also configured to receive a request to export vehicle system and state settings to a key memory. The processor is further configured to access a plurality of predefined settings, designated as key-storable settings, from a vehicle CAN bus, responsive to the request, and transmit the predefined settings to the key, including instructions to store the settings to the key memory.

In a second illustrative embodiment, a method includes detecting a key used to start or unlock a vehicle. The method further includes determining that the key includes a memory having a saved set of vehicle system and state settings and, responsive to vehicle startup and the determining, loading the saved set of vehicle system and state settings from the key, such that vehicle systems and states corresponding to the saved set of vehicle system and state settings are set according to the saved set.

In a third illustrative embodiment, a method includes detecting a user-initiated change to a vehicle state or setting, different from a state or setting loaded from a detected vehicle key upon vehicle startup. The method also includes, responsive to the detecting, presenting a user with an option to save the user-initiated change to overwrite the loaded state or setting in a key memory of the detected key. The method further includes, responsive to confirmation and the detecting, overwriting a previously saved vehicle state or setting with the user-changed vehicle state or setting.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
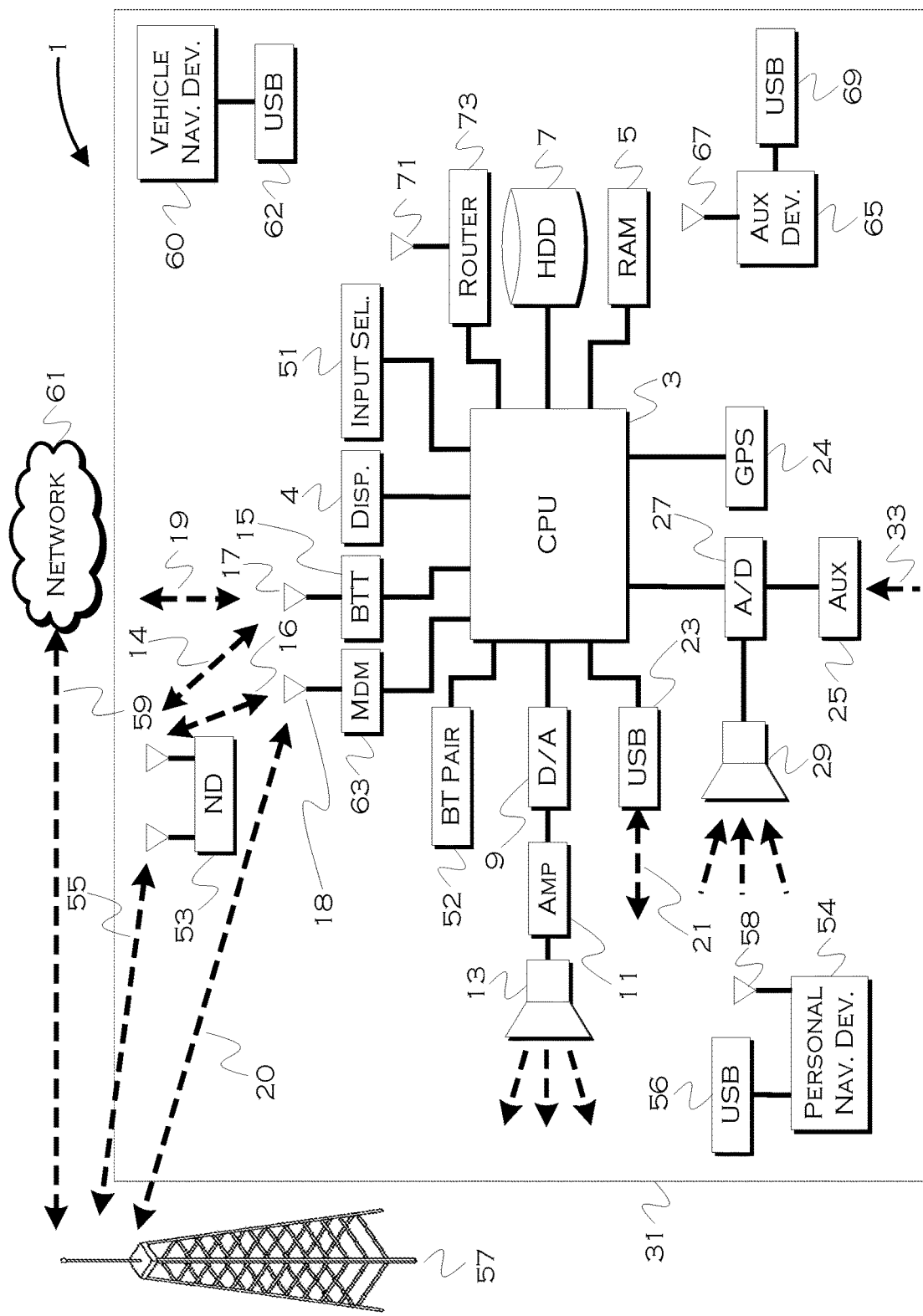
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11 g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

By allowing for key-portable vehicle system settings, and keys that can save complex state sets as well as load those state sets directly to vehicles, the illustrative embodiments provide for improved persistent control over vehicle systems, as well as allowing for varied key usage to dictate different control and system state settings. The novel, uncommon and atypical examples and concepts described herein demonstrate potential improvements achievable through use of those examples, concepts, and the like.

Figure 2:
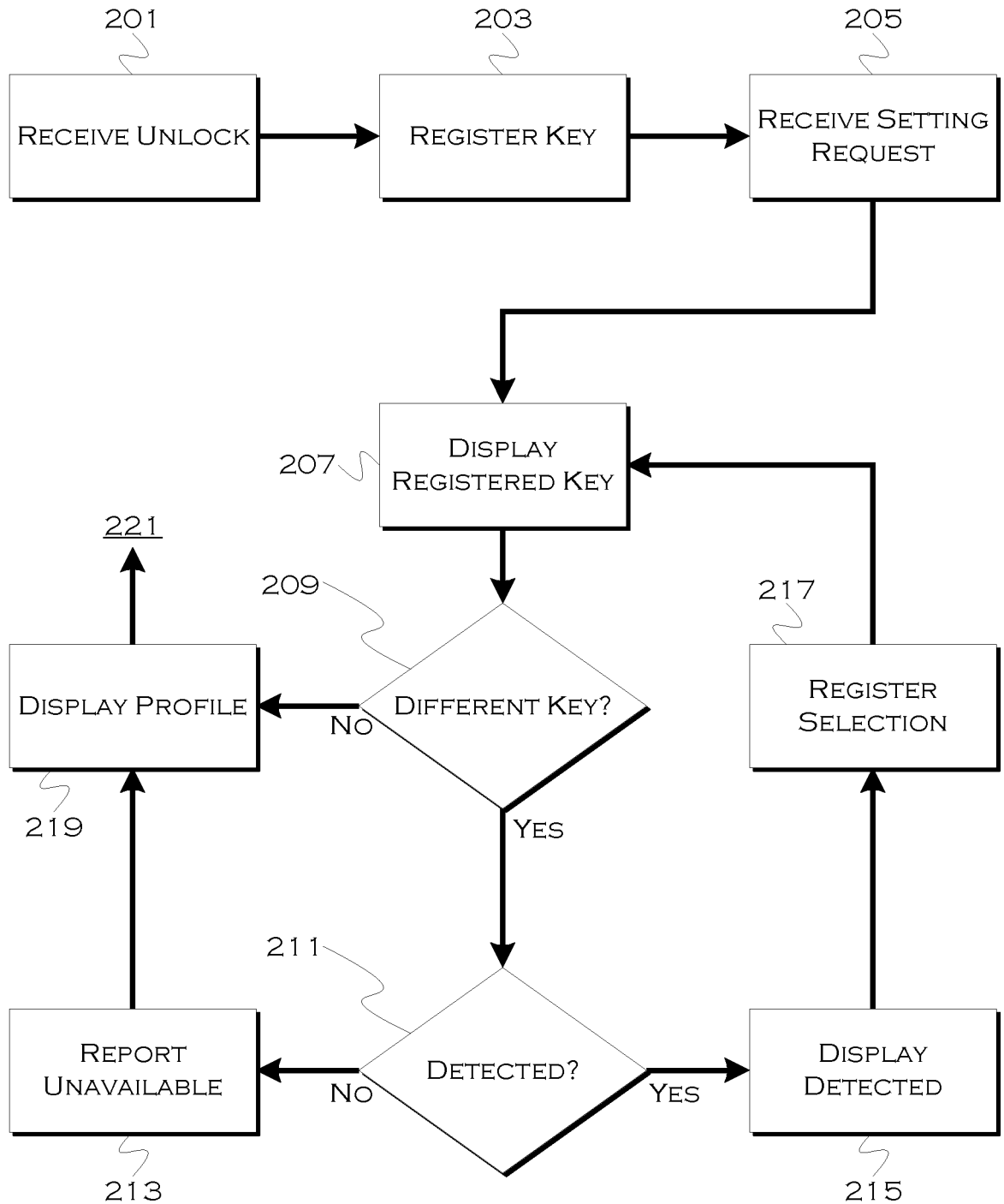
FIG. 2 shows an illustrative example of a process for saving settings to a vehicle key.
Figure 2:
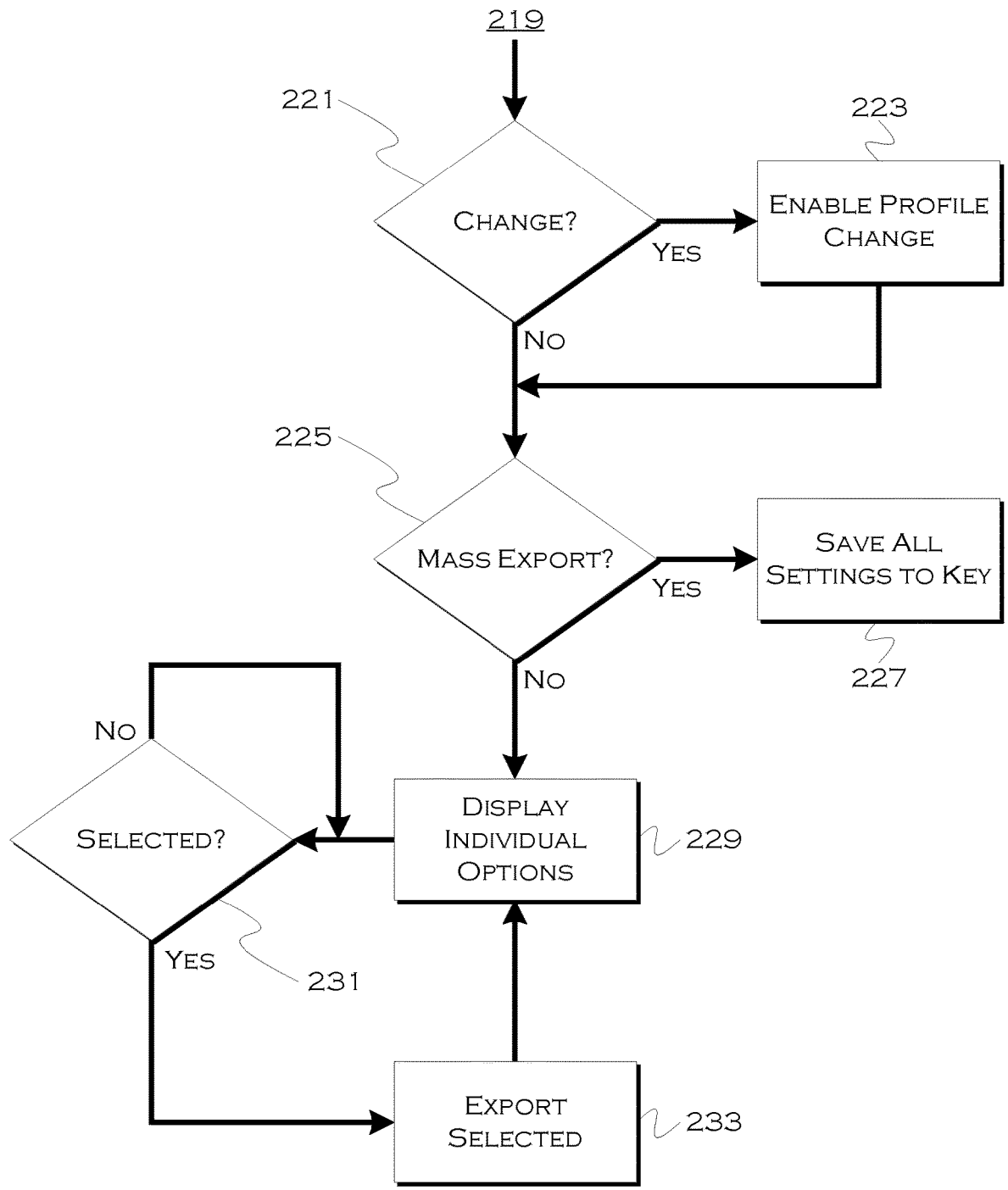

FIG. 2 shows an illustrative example of a process for saving settings to a vehicle key. In this illustrative example, the process receives an unlock command 201, which can either be sent from a key or facilitated via a door-button and approved on the detection of a key.

Since a user may have more than one key present, for example, if a driver and passenger both possess separate keys, the process, in this example, registers 203 the key used to unlock the vehicle. This may not even be the driver key, if the passenger unlocks a door first using a second key, for example, but it is useful for distinguishing one key from a group of detected keys. In other examples, if a key is designated as primary, that key may be detected from the group, and/or certain keys may have certain variables included therewith (e.g., a "weekend key" for Sat/Sun use and a "weekday key" for Mon-Fri use), and the selected key may then correspond to the day of week, if both are present.

How a given key is chosen initially can be a time-saving function, but in this example, the driver or passenger always has the option to change the selected key, and thus the initial selection is not necessarily critical. It is useful when saving settings, however, to confirm that the correct key is selected for the save operation, when multiple keys are present and/or detected. If direct connection is used to save the settings, this option may be less important, but the system may still identify which key is directly connected, to avoid user-error.

In this example, the process also receives 205 a request, from a user, to save one or more vehicle state or system settings to a key memory. This can be a user-originated request, or the request can be selected in response to changing one or more savable settings. In at least one example, the manufacturer defines a set of states and settings which can be key-savable. This can include some settings, such as exhaust settings, which are traditionally always reset upon start, and which can be saved following acquiescence to any necessary legal disclaimers about changing the default exhaust settings. In some instances, the request may be to export an entire set of settings, but, also, in some instances, and in order to save key memory, the system may only export settings which have a variance from predefined vehicle base-states, such that only changes are saved to the key.

In traditional key-based setting systems, the keys may define a given user and the user identification may be the basis to retrieve a vehicle-saved set of states. That is, the key defines which set of states, saved on the vehicle, are used to configure the vehicle. In the illustrative embodiments, however, the settings are actually exported to the key, making the settings effectively portable, if the key could be used for multiple vehicles (such as a phone key), and or portably editable if the key is connected to a PC or other device. In this manner, the user can access the key, see the settings and change the settings, even when the user is not actually physically present in the vehicle. In some instances, such as when a phone is used as a key, the user may actually be able to change modes via the device interface, allowing the phone to effectively function as multiple keys. This option would work on fobs with sufficient memory as well, although the user would need some method to cycle through the various selections to engage a particular selection as active.

In this process, the vehicle (and/or phone, if the phone is being used as a key) displays 207 the currently registered key. As noted, this can include the key used to unlock or start the vehicle, which can include the key being physically used to engage a lock or start, and/or the key on the basis of which the lock or start was authenticated. If the user wants to save settings to a different key 209, the process can determine 211 if another key is detected.

If there are no other keys detected, the process may report 213 that other keys are unavailable, and may display the profile 219 for the only detected key. If there are other keys available, the process may display 215 the other keys that are detected, in a selectable manner, if not already so displayed, and may register 217 a user selected key as the selected key.

Once the user has elected the correct (or only) key, the process may display a profile associated with this key. An example of the profile is discussed below with respect to FIG. 4. The user can elect to change a profile setting (e.g., a key name or associated user), an individual state or system setting, or export the whole set of current system states and settings.

If the user elects 221 a profile change, the process may enable 223 a change screen for changing a key name or other "profile" type setting, which could include, for example, an associated user name, days of week or times of day when the setting is preferred or active, or other designators defining the key profile. While this process is described with respect to exporting a set of states and system settings from a vehicle, it is also appreciated that a PC or other device can be connected to a key, and similar changes can be made via the PC.

The process also determines 225 if the user desires a mass-export of system and state settings. In this example, the vehicle will export an entire set of predefined (predefined as savable) settings 227, overwriting any currently saved settings or states for that identifier in the key memory. In some example, as noted, the process will only export settings that have been changed from default states, which can help save key memory space.

If the user does not want to mass export settings, but only wants to export one or more specified settings, the process may display 229 individual exportable options, in a selectable manner. If the user selects a given option, the process may export a currently-defined value for that option, or may display the currently defined value on a vehicle human machine interface (HMI), prior to exporting upon confirmation of the displayed value.

Figure 3:
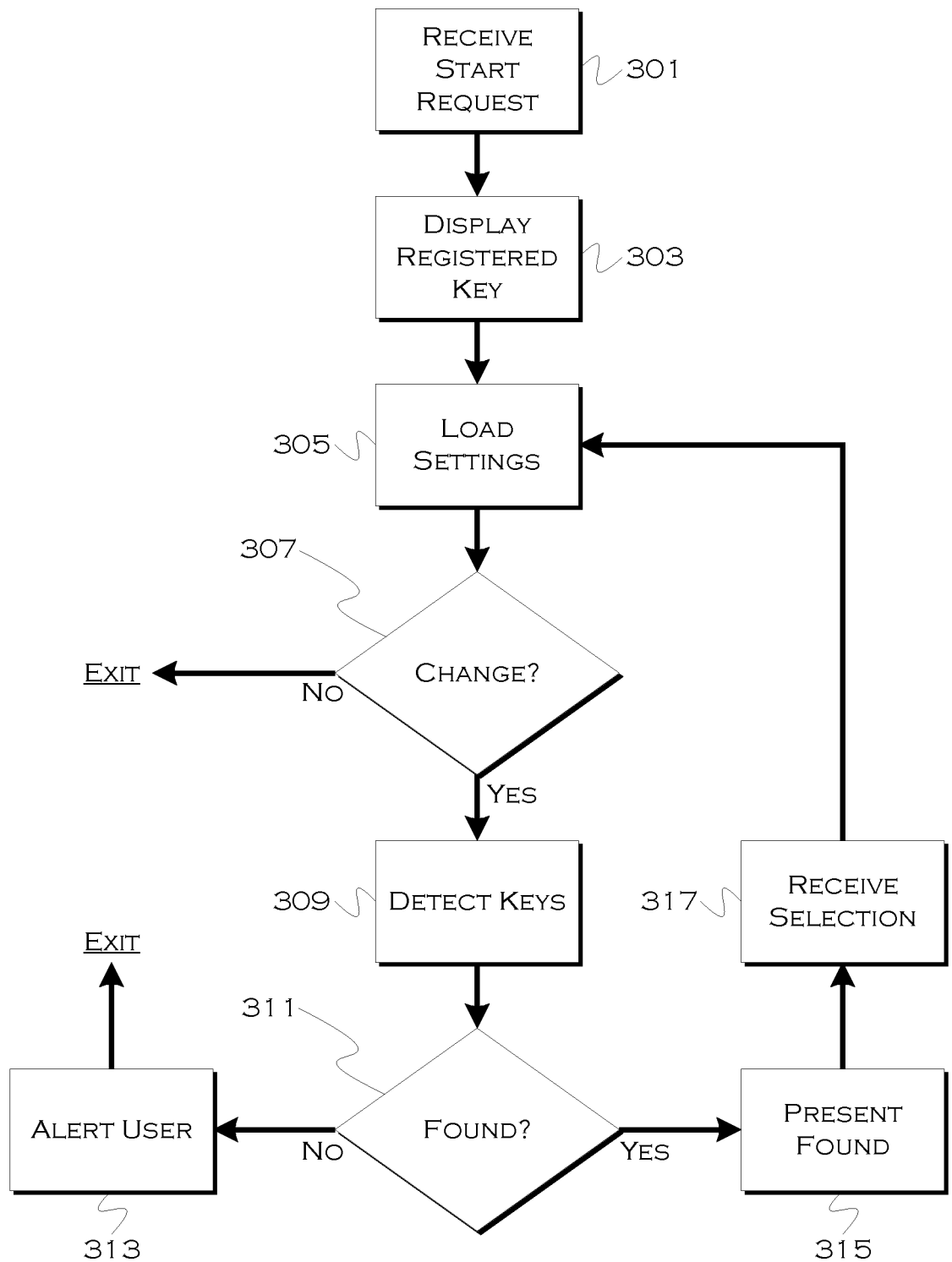
FIG. 3 shows an illustrative process for vehicle state and system setting using a set of key-saved vehicle system and state settings.

FIG. 3 shows an illustrative process for vehicle state and system setting using a set of key-saved vehicle system and state settings. In this example, the process may receive 301 a vehicle start request. This request can be from a physical key, having a memory associated therewith, but more frequently now it is based on a vehicle button depress, and the start is authenticated based on the presence of a key. In this example, the authenticating key is the initial registered key, although the user can change which, from a plurality of detected keys, key is used for defining the loaded states.

In this example, the process may display 303, via a vehicle HMI, or a phone HMI if a phone is used as a key or is connected to a vehicle infotainment system, the currently registered key. Again, the currently registered key may be the key used for start or unlock authentication, or the key used to start or unlock the vehicle.

Here, the process loads 305 a set of settings associated with and stored on the registered key, which includes downloading the particular state and system settings from the key. A user may elect to change 307 the registered key, to load a new set of settings, or may elect to use the downloaded settings from the registered key.

If the user elects to change the key, the process may attempt to detect 309 additionally present keys, or, in the case of a phone key, or key with multiple profiles, the system may detect the additionally-present profiles. If an additional key or profile is not found 311, the process may alert the user 313 that no other options are found, and the process may exit. The process may also present the user with the option to revert to factory (or previously set, onboard settings, existing before the current setting-load). To further the reversion, the system may preserve previously set state and system settings until the user confirms use of the current loaded set. The user may also define a default onboard set of settings to use when a particular key's settings are not desired. For example, if a user has a track-key, designed to engage performance settings on a track, and the user needs to go to the grocery store, but can only find the track key to start the vehicle, the user may not want to load the track settings to travel to the grocery store. Thus, even though no other keys are present, the user could elect to revert to the base defined set of settings to avoid engagement of the track settings for the trip to the store.

If the user requests different settings and a different key or profile having different settings is detected 311, the process may selectably display alternative options 315. If the user selects 317 a different saved state set or the default vehicle-saved state set (which may also be saved to a key, as a secondary set), the process may load 305 the settings responsive to the selected alternative set.

Figure 4:
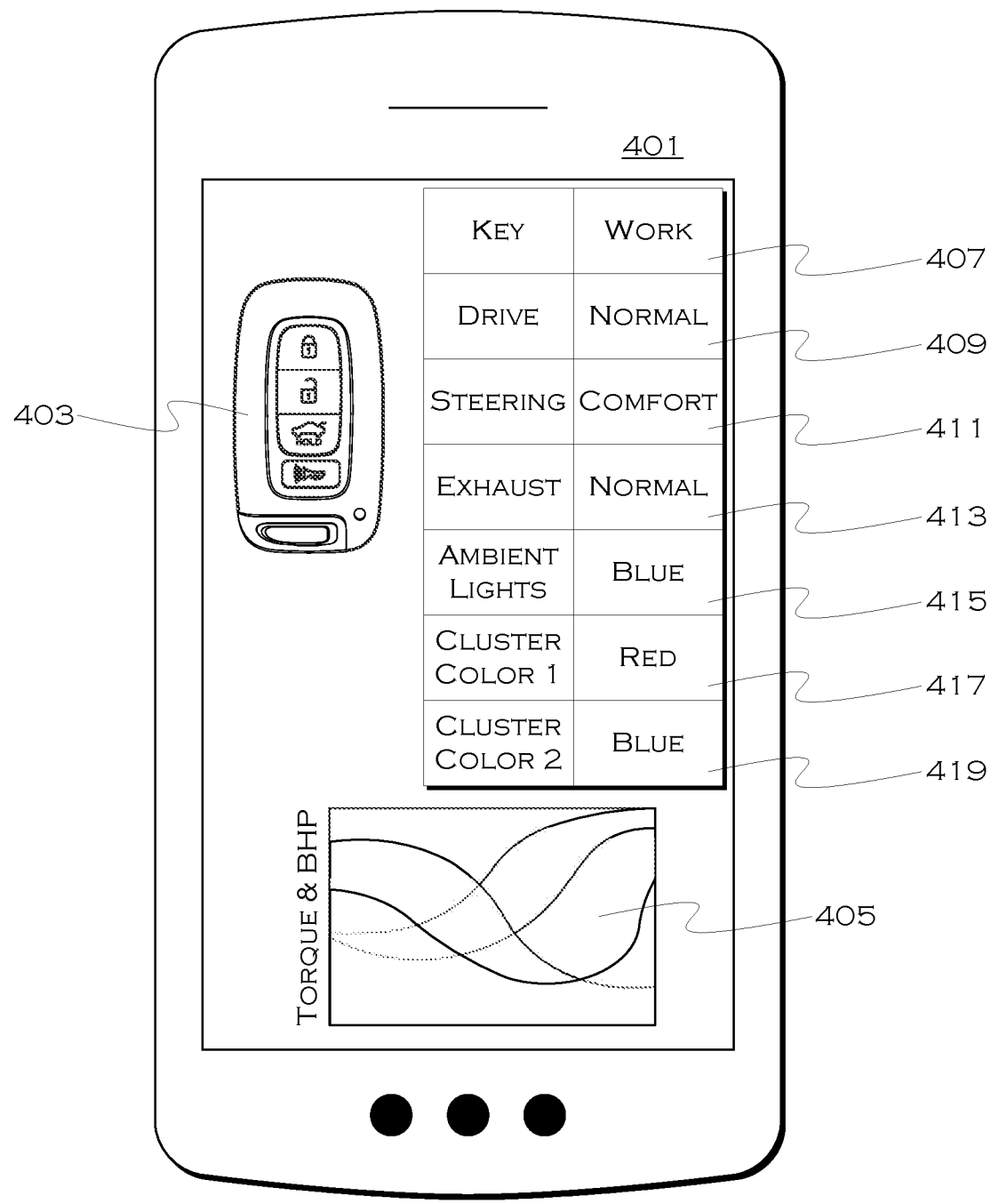
FIG. 4 shows an illustrative example of a displayed set of settings.

FIG. 4 shows an illustrative example of a displayed set of settings. In this example, the settings are displayed via a phone HMI 401, but the same settings could be displayed via a vehicle HMI and/or a PC HMI. Here, a summary of each illustrative setting is included, as well as a picture 403 of the fob. This process may also display a performance graph 405 indicating relative performance of a currently selected set of settings as opposed to an alternative (alternatively selectable based on present devices/keys) set or a default set. This performance graph can include, for example, fuel usage profiles, acceleration and braking profiles, turning profiles, etc.

In this example, a variety of illustrative states and system settings are shown, as well as key profile data. Each or some options may be user-selectable both to see characteristics of the given state or system, and/or an option to change the settings associated therewith. For example, the displayed key is registered as a "work" key 407, and selection of this aspect may provide a set of days and/or times during which the key should function to load settings or have primacy over other detected keys.

The drive settings are "normal," 409 but selection of this option could allow for a change to "sport" or other pre-defined performance settings. Steering 411 is set to comfort, but the driver could be provided with steering options that were more responsive, for example, or which relied less on power steering if desired. Exhaust 412 settings are normal, but could be changed as desired. It is also possible that, if a graph is displayed or displayable, the graph could reflect changes to, for example, horsepower or torque based on requested changes, compared to currently selected or engaged options.

The user could also change ambient 413 and cluster 415, 417 lighting from this menu, and the display may show a replicated in-vehicle environment reflecting the requested changes, for evaluation purposes.

Figure 5:
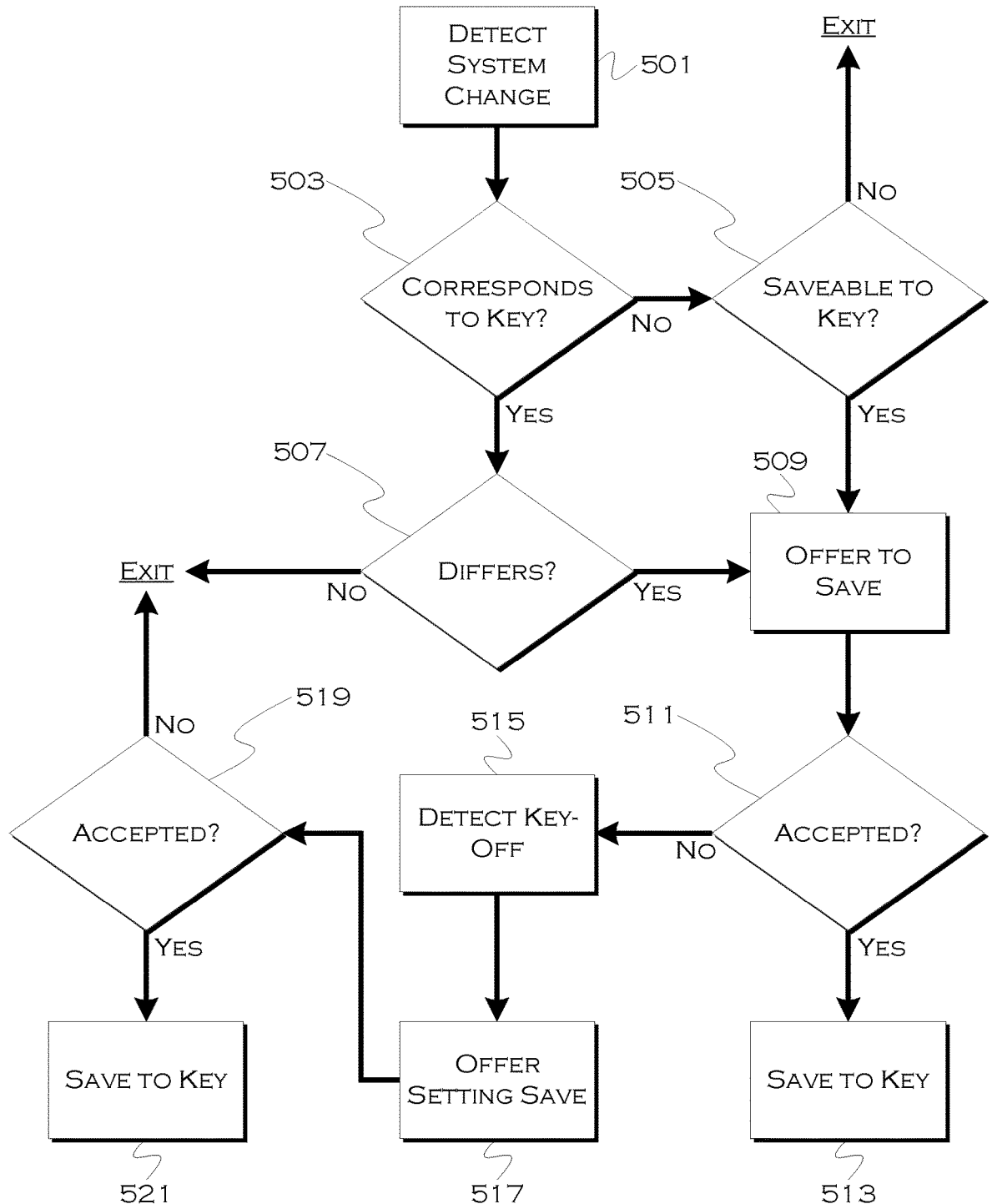
FIG. 5 shows an illustrative example of an automatic offering for system state saving, based on detected user changes to a savable system or state.

FIG. 5 shows an illustrative example of an automatic offering for system state saving, based on detected user changes to a savable system or state. In this example, the vehicle detects 501 a change to a vehicle system or state. This can include, but is not limited to, radio settings, exhaust settings, steering settings, traction control settings, powertrain settings, braking settings, etc. Any state designated by the manufacturer as being savable to a new profile, and/or to a key memory, may be definable and detected in the manner described.

In this example, the process will only attempt to save states not already saved to the detected key. So, for example, if the user loaded a certain state set from a key, which included steering redefinition but which did not include braking redefinition, the process may determine if a change to steering (already defined for the key) 503 occurred. If the change occurred for a key-defined and saved state, and the current setting differs 507, the process may offer 509 to save the new setting, including display of the old setting and a notification that the currently saved setting will change.

On the other hand, if the user altered a braking setting, for example, and no braking setting change was currently associated with the key's loaded settings, the process may determine that this is 505 a setting savable to a key, and may notify the user of such an option 509, as well as notifying the user that no current braking profile change is currently saved to the key. This can help prevent accidental modification of key settings based off of a one-off change that was not intended to replace or add to a currently saved set of key settings, while still accommodating for fast and easy changes to key settings based on changed vehicle system or state settings.

In this example, if the user agrees to save the vehicle state or setting changes 511, the process may save or overwrite 513 the settings on the detected key. In some examples, the process may detect a plurality of keys and offer to save or overwrite the settings to a different key memory, again showing variances between the changed settings and anything currently saved on the selected key, if desired.

If the user declines to save the changes upon change-detection, the process may detect a key-off at a later time 515, and may then offer 517 to save the changes again. This could be useful if the user is driving or otherwise distracted when the change is made, or if the user wants to evaluate the effects of the change over a drive, before deciding whether or not to save the changes to the key.

If the user agrees to save the change, the process again can save 521 the change to the current key or to another user-selected key.

The illustrative embodiments allow for improved portability of advanced user-dictated vehicle system state settings, which can travel with a key and require no remote access to implement, as well as providing persistent control over advanced vehicle settings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
detect a vehicle key and display a key identification on a vehicle display;
receive a request to export vehicle system and state settings from a vehicle to a key memory;
responsive to the request, access a plurality of predefined settings, designated as key-storable settings, from a vehicle controller area network (CAN) bus; and
transmit the predefined settings to the key, including instructions to store the settings to the key memory.

2. The system of claim 1, wherein the processor is configured to detect the key used to unlock the vehicle.

3. The system of claim 1, wherein the processor is configured to detect the key connected directly to the vehicle.

4. The system of claim 1, wherein the predefined settings include settings changed from predefined default settings.

5. The system of claim 1, wherein the processor is configured to detect a plurality of keys, and selectably display the plurality of keys, including key identification for each on the vehicle display.

6. The system of claim 5, wherein the request to export vehicle system and state settings to the key includes selection of a selectably displayed one of the plurality of keys.

7. The system of claim 1, wherein the processor is configured to receive a request to export a user-specified vehicle system or state setting.

8. The system of claim 7, wherein the processor is configured to receive the user-specification based on a selectably displayed list of exportable settings.

9. The system of claim 7, wherein the processor is configured to display a current setting value of the user-specified vehicle system or state, prior to export, via a vehicle human machine interface (HMI); and
transmit the displayed value as the predefined value, responsive to confirmation following the display of the value.

10. A method comprising:
detecting a key used to start or unlock a vehicle;
determining that the key includes a memory having a saved primary set of vehicle system and state settings;
responsive to vehicle startup and the determining, loading the saved primary set of vehicle system and state settings from the key, such that vehicle systems and states corresponding to the saved set of vehicle system and state settings are set according to the saved primary set;
detecting one or more secondary sets of saved vehicle and system state settings, at least one of the vehicle and system state settings including a different value for a vehicle and system state set by the primary settings following the loading;
presenting the one or more secondary sets of saved settings in a user selectable manner on a vehicle display; and
responsive to user selection of one of the presented secondary sets, loading a selected secondary set in place of the loaded saved set.

11. The method of claim 10, wherein the detecting includes detecting the key physically used to unlock or start the vehicle.

12. The method of claim 10, wherein the detecting includes detecting the key used to digitally authenticate a start or unlock request made at the vehicle.

13. The method of claim 10, wherein the one or more secondary sets are saved on the memory of the detected key.

14. The method of claim 10, wherein the one or more secondary sets are saved on a memory of an additionally detected key.

15. The method of claim 10, further comprising displaying a performance graph comparing an aspect of vehicle performance of a currently loaded set compared to a default or alternatively selectable set, based on detected selectable alternative sets.

16. A method comprising:
detecting, at a vehicle, a user-initiated change to a vehicle state or setting, different from a state or setting loaded from a detected vehicle key upon vehicle startup;
responsive to the detecting, presenting a user with an in-vehicle option to save the user-initiated change to overwrite the loaded state or setting in a key memory of the detected key; and
responsive to confirmation and the detecting, overwriting a previously saved vehicle state or setting with the user-changed vehicle state or setting by transferring the information from the vehicle to the key.

17. The method of claim 16, further comprising presenting a performance graph detailing an aspect of vehicle performance changing as a result of the user- initiated change, comparing the aspect based on the loaded state or setting compared to the user- changed state or setting.

* * * * *